Dec. 13, 1927.
L. WENSEL
CASEMENT FASTENER
Filed Feb. 25, 1926
1,652,548
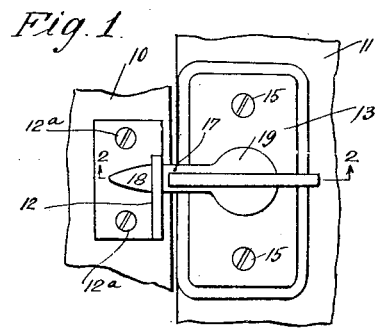
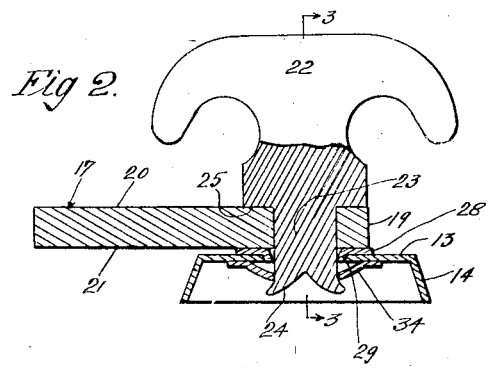
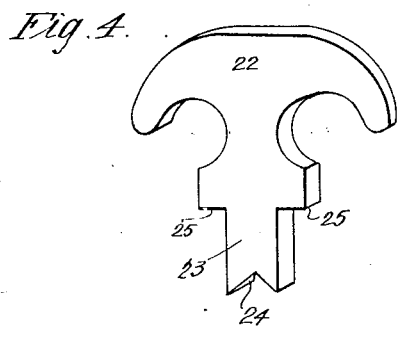
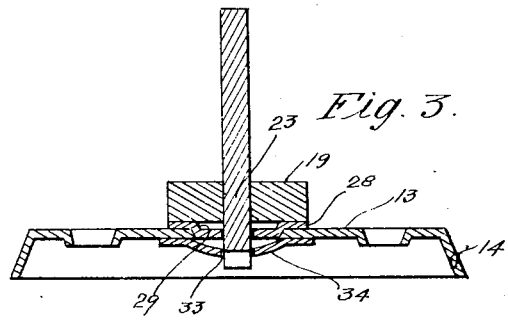
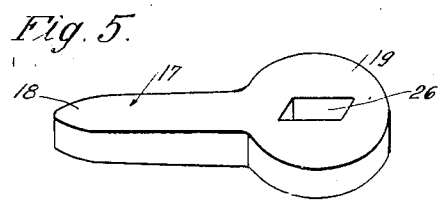
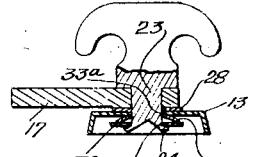
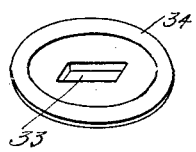
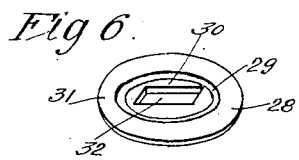
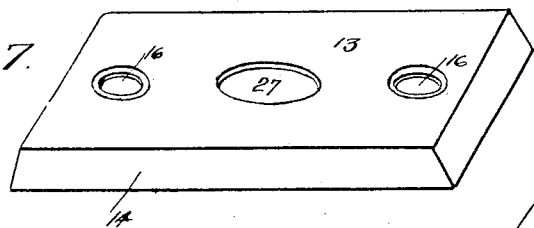
Inventor
Louis Wensel.
Attorney Patented Dec. 13, 1927.

1,652,548

UNITED STATES PATENT OFFICE.

LOUIS WENSEL, OF LOS ANGELES, CALIFORNIA.

CASEMENT FASTENER.

Application filed February 25, 1926. Serial No. 90,450.

This invention has to do generally with fastening devices and is more particularly concerned with fasteners of the "turn-button" type. Since the invention is particularly well adapted for embodiment in turn buttons used for fastening casements or sashes of windows arranged to open on hinges at the side, I will describe such an embodiment, but it will be understood this is not to be construed as in any way limiting the invention to such specific application.

In order that the nature and objects of the present invention may be pointed out more clearly, I will first discuss the construction of a usual fastener, and then point out wherein my device differs. The usual fastener includes a pressed or cast plate having marginal flanges which space it from the window to which it is affixed. The bolt and handle are cast in a single piece, there being an integral shank on the underside of the bolt, which shank extends through an aperture in the plate and then through a spring washer below the plate. The countersunk end of the shank is spread or headed over to hold the several elements in assembly. The underside of the bolt is held in frictional engagement with the upper side of the plate, the frictional engagement of the washer and bolt with the plate being depended upon for holding the bolt releasably in adjusted position. Due to the presence of the shank, it is practically impossible, except at excessive cost, to finish the underside of the bolt casting so it has proper, even frictional engagement with the plate and consequently it is usually found that the bolt rotates with undue ease during certain stages of its rotation, and binds during other stages.

Therefore, it is among the objects of the present invention to provide a catch which shall have none of the above mentioned objectionable features, the device being generally characterized as a catch which is cheaply and easily manufactured, requires no finishing operations on the several elements, is smooth in action, and is retained frictionally in adjusted position, irrespective of the position to which the bolt may be turned, with sufficient firmness to prevent it from being rotated by jarring or vibration. How this is accomplished will be made apparent in the following detailed description, reference being had to the accompanying drawings, in which:

Fig. 1 is a fragmentary elevation of a casement sash equipped with an embodiment of my invention;

Fig. 2 is a section on line 2—2 of Fig. 1;

Fig. 3 is a section on line 3—3 of Fig. 2;

Fig. 4 is a perspective view of the operating handle;

Fig. 5 is a perspective view of the bolt;

Fig. 6 is a perspective view of the spacing washer;

Fig. 7 is a perspective view of the plate or supporting member;

Fig. 8 is a perspective view of a spring washer; and

Fig. 9 is a view similar to Fig. 2 but showing a variational form of spring washer.

In Fig. 1, numerals 10 and 11 designate a casing and casement sash, respectively, while a keeper 12, of any suitable type, is shown attached to casing 10 by screws 12$^a$. A cast or pressed metal base plate or supporting member 13 has marginal, downturned flanges 14 whereby it is spaced from sash 11, screws 15 passing through the plate at 16 to secure it to the sash.

Bolt 17, consisting of a tongue portion 18 and hub portion 19, is mounted on plate 13 and is adapted to be oscillated into and out of engagement with keeper 12 when the casement sash is closed. Preferably, bolt 17 is stamped from sheet metal, thus insuring flat, even upper and lower faces 20 and 21, respectively, and insuring that the bolt be of uniform thickness throughout, though such a condition is not pertinent to the invention.

While I may fashion the operating handle in a variety of manners, all within the scope of my broader claims, even to the extent of making it an integral extension of the bolt, I prefer to make it of a separate stamping and integral with the shank through which connection is made to the base plate. I will, therefore, describe the handle and shank as being made up of a single piece rigidly held in assembly with the bolt, but it will be understood my broader claims contemplate the making and securing of the handle and shank independently, or making either integral with the bolt.

Thus, I show the operating handle made up of a flat stamping consisting of a body portion 22 and a shank portion 23, the shank being of rectangular cross section and, preferably, though not necessarily, being forked at its lower end 24. Downwardly facing or laterally extending shoulders 25 are formed between body portion 22 and shank 23.

Shank 23 is pressed with force fit through a complementarily shaped aperture 26 in hub 19 of bolt 17, shoulders 25 being brought into full engagement with upper face 20 of the bolt. Such full engagement is assured due to the flat, even nature of the bolt face and shoulders as the pieces come from the punch press, though it may here be stated that it lies within the scope of my invention to make these pieces of cast metal.

Plate 13 is provided with a circular aperture 27 which is appreciably larger in cross section than shank 23. Shank 23 is adapted to extend through aperture 27, but for the purpose of providing a proper bearing for the shank within the plate, as well as for other purposes, I introduce a spacing and bearing washer 28 between the lower face 21 of the bolt and the upper face of the base plate. Washer 28 has an annular shoulder 29 adapted to have bearing engagement with the plate by extending through aperture 27, and while this shoulder may be formed on the washer in any suitable manner, I prefer to form it by depressing the central portion of the washer as at 30. This leaves only the underside of rim portion 31 of the washer in bearing engagement with plate 13; depressed portion 30 having an aperture 32 complementary to and adapted to take shank 23 so the shank and washer are held against relative rotation. It follows that when handle 22 is oscillated to operate the bolt, rim portion 31 of the washer bears on and moves over the upper face of the plate, and shoulder 29 bears smoothly in aperture 27 and holds the handle and shank properly centered in said aperture. The opposed smooth, flat faces of the plate and washer 28 provide excellent bearing surfaces and therefore contribute to the smooth action of the fastener. Since the rim of the washer is interposed between plate 13 and bolt hub 19, said washer serves to space the tongue portion of the bolt from the upper face of the plate, undue friction between bolt and plate thus being avoided. This spacing of the plate and tongue also prevents the tongue from catching on the plate in case the opposed surfaces have irregularities or if there be edge burrs on the tongue as a result of punch press operations thereon.

Shank 23 extends through a rectangular aperture 33 in dished or spring washer 34 which is arranged at the lower side of plate 13. The forked end 24 of the shank is spread or headed over in an obvious manner to hold the several elements in assembly and to draw washers 28 and 34 into frictional engagement with opposite sides of plate 13 so the bolt is retained frictionally in adjusted position. It is self-evident that since both washers 28 and 34 are non-rotatively connected to shank 23, both these washers are rotated with the shank when handle 22 is operated, and that neither bolt nor shank bear on or engage the base plate in any way.

In Fig. 9 I have shown a slightly different assembly beneath plate 13. A tempered steel spring washer $34^a$ preferably has a rectangular central aperture $33^a$ and is slipped over shank 23 with its convex face engaging the under face of plate 13. A flat washer 36, preferably of soft steel, has a rectangular central aperture $36^a$ to take shank 23 below washer $34^a$, and the forked end 24 is spread or headed over, as described above, to hold the elements in assembly and to draw washers 28 and $34^a$ into frictional engagement with the opposite sides of plate 13. Since only the high point of washer $34^a$ engages plate 13, smoothness of bolt action is assured.

It will be understood the drawings and description are to be considered merely as illustrative of and not restrictive on the broader claims appended hereto, for various changes in design, structure and arrangement may be made without departing from the spirit and scope of said claims.

I claim:

1. In a fastener of the character described, a plate having an aperture therethrough, an oscillatory bolt on the plate, a spacing washer between the bolt and plate and having an annular shoulder extending below its lower face and bearing in said plate aperture, a shank of polygonal cross-section extending from the lower face of the bolt and through and below a central aperture of complementary outline provided in said washer, and means coacting with the shank and lower face of the plate adapted to hold said plate, washer and bolt in assembly.

2. In a fastener of the character described, a plate having an aperture therethrough, an oscillatory bolt on the plate, a spacing washer between the bolt and plate and having a centrally depressed portion extending into and having bearing in said plate aperture, a shank extending from the lower face of the bolt and through and beyond an aperture provided in said depressed portion, and means on the end of the shank below the plate adapted to hold the plate, washer and bolt in assembly.

3. In a fastener of the character described, a plate having an aperture therethrough, an oscillatory bolt on the plate, a spacing washer between the bolt and plate and having a centrally depressed portion extending into and having bearing in said plate aperture, a shank extending from the lower face of the bolt and through and beyond an aperture provided in said depressed portion, coacting means on the shank and washer adapted to hold them against relative rotation, and means on the end of the shank below the plate adapted to hold the plate, washer and bolt in assembly.

4. In a fastener of the character described, a plate having an aperture therethrough, an oscillatory bolt on the plate, a spacing washer between the bolt and plate and having a centrally depressed portion extending into and having bearing in said plate aperture, a shank extending from the lower face of the bolt and through and beyond an aperture provided in said depressed portion, coacting means on the shank and washer adapted to hold them against relative rotation, means on the end of the shank below the plate adapted to hold the plate, washer and bolt in assembly, and a washer on the shank below the plate, the end of said shank being headed over in a manner to hold the plate, washers and bolt in assembly and to hold the two washers in frictional engagement with opposite sides of the plate.

5. In a fastener of the character described, a plate having an aperture therethrough, an oscillatory bolt on the plate, a spacing washer between the bolt and plate and having an annular shoulder extending below its lower face and bearing in said plate aperture, an operating handle consisting of a body portion and a depending shank portion, there being a downwardly facing shoulder at the junction of said body and shank portions, said shank portion being of polygonal cross-section and being pressed with force fit through a complementarily formed aperture in the bolt to bring said shoulder into engagement with the upper face of the bolt, said shank extending downwardly through a complementarily formed aperture in the washer; and means on the end of the shank below the plate adapted to hold the plate, bolt and washer in assembly.

In witness that I claim the foregoing I have hereunto subscribed my name this 19th day of December 1925.

LOUIS WENSEL.